US010002124B2

(12) United States Patent
Bishop et al.

(10) Patent No.: US 10,002,124 B2
(45) Date of Patent: Jun. 19, 2018

(54) CLASS-NARROWING FOR TYPE-RESTRICTED ANSWER LOOKUPS

(71) Applicant: International Business Machines Corporation, Armonk, NY (US)

(72) Inventors: Timothy A. Bishop, Minneapolis, MN (US); Stephen A. Boxwell, Columbus, OH (US); Benjamin L. Brumfield, Cedar Park, TX (US); Stanley J. Vernier, Columbus, OH (US)

(73) Assignee: International Business Machines Corporation, Armonk, NY (US)

(*) Notice: Subject to any disclaimer, the term of this patent is extended or adjusted under 35 U.S.C. 154(b) by 32 days.

(21) Appl. No.: 15/211,839

(22) Filed: Jul. 15, 2016

(65) Prior Publication Data
US 2018/0018313 A1 Jan. 18, 2018

(51) Int. Cl.
*G06F 17/21* (2006.01)
*G06F 17/27* (2006.01)
(Continued)

(52) U.S. Cl.
CPC .......... *G06F 17/271* (2013.01); *G06F 17/241* (2013.01); *G06F 17/274* (2013.01);
(Continued)

(58) Field of Classification Search
CPC .... G06F 17/00; G06F 17/271; G06F 17/2775; G06F 17/30734; G06F 17/2755;
(Continued)

(56) References Cited
U.S. PATENT DOCUMENTS

| 7,526,425 B2* | 4/2009 | Marchisio ......... G06F 17/30672 704/9 |
| 7,953,593 B2* | 5/2011 | Marchisio ......... G06F 17/30672 704/9 |

(Continued)

OTHER PUBLICATIONS

"About: politician", http://dbpedia.org/ontology/Politician http://dbpedia.org/ontology/Politician, publication date unknown; retrieved from the Internet Apr. 5, 2016, 2 pages.
(Continued)

*Primary Examiner* — Edgar Guerra-Erazo
(74) *Attorney, Agent, or Firm* — Stephen R. Tkacs; Stephen J. Walden, Jr.; Diana R. Gerhardt

(57) ABSTRACT

A mechanism is provided in a data processing system configured with a natural language processing pipeline executing on at least one processor of the data processing system, for class narrowing for answer lookups. The natural language processing pipeline annotates an input question with a verb in the input question and a syntactic relation between the verb and a focus of the question. A class narrowing component of the natural language processing pipeline finds an entry in a verb/type lookup resource corresponding to the verb and the syntactic relation. The entry comprises the verb, the syntactic relation, and a set of classes. Each given class in the set of classes has a corresponding frequency value representing a frequency the given class occurs with the syntactic relation to the verb. The class narrowing component performs class-narrowed type-restricted answer lookup from a topology based on the entry in the verb/type lookup resource to generate a set of candidate answers.

20 Claims, 5 Drawing Sheets

(51) Int. Cl.
*G06F 17/30* (2006.01)
*G06N 3/00* (2006.01)
*G06F 17/24* (2006.01)

(52) U.S. Cl.
CPC ...... *G06F 17/2785* (2013.01); *G06F 17/3043* (2013.01); *G06N 3/006* (2013.01)

(58) Field of Classification Search
CPC ............... G06F 17/278; G06F 17/2705; G06F 17/30654; G06F 17/30684; G06F 17/30604; G06F 17/30696; G06F 17/30663; G06N 99/00; G06N 99/005
See application file for complete search history.

(56) References Cited

U.S. PATENT DOCUMENTS

| | | | | |
|---|---|---|---|---|
| 8,131,540 | B2* | 3/2012 | Marchisio | G06F 17/30672 704/9 |
| 8,275,803 | B2 | 9/2012 | Brown et al. | |
| 8,370,128 | B2* | 2/2013 | Brun | G06F 17/2705 704/10 |
| 9,015,031 | B2 | 4/2015 | Ferrucci et al. | |
| 9,153,142 | B2 | 10/2015 | Bagchi et al. | |
| 2005/0091036 | A1* | 4/2005 | Shackleton | G06F 17/2705 704/9 |
| 2005/0273314 | A1* | 12/2005 | Chang | G06F 17/2705 704/4 |
| 2007/0073533 | A1* | 3/2007 | Thione | G06F 17/279 704/9 |
| 2009/0271179 | A1* | 10/2009 | Marchisio | G06F 17/30672 704/9 |
| 2009/0287678 | A1 | 11/2009 | Brown et al. | |
| 2009/0292687 | A1 | 11/2009 | Fan et al. | |
| 2010/0082331 | A1* | 4/2010 | Brun | G06F 17/2705 704/9 |
| 2011/0066587 | A1 | 3/2011 | Ferrucci et al. | |
| 2011/0125734 | A1 | 5/2011 | Duboue et al. | |
| 2012/0330934 | A1* | 12/2012 | Duboue | G06F 17/30675 707/722 |
| 2013/0007055 | A1 | 1/2013 | Brown et al. | |
| 2013/0018652 | A1 | 1/2013 | Ferrucci et al. | |
| 2013/0035931 | A1 | 2/2013 | Ferrucci et al. | |
| 2013/0066886 | A1 | 3/2013 | Bagchi et al. | |
| 2014/0258286 | A1 | 9/2014 | Brown et al. | |

OTHER PUBLICATIONS

"Extensible Method for Criteria-Driven Answer Scoring in a Deep Question Answering System", Disclosed Anonymously, www.ip.com, Technical Disclosure, IP.com No. 000239037, Oct. 2, 2014, 5 pages.

"Method of Computing Relevancy Score in a Question and Answering System", Disclosed Anonymously, www.ip.com, Technical Disclosure, IP.com No. 000222407, Oct. 2, 2012, 4 pages.

High, Rob, "The Era of Cognitive Systems: An Inside Look at IBM Watson and How it Works", IBM Corporation, Redbooks, Dec. 12, 2012, 16 pages.

Lu, Yonghe et al., "Answer Extraction Model Based on Named Entity Recognition", Applied Mechanics and Materials, vol. 571-572, Abstract only, Jun. 2014, 1 page.

McCord, M.C. et al., "Deep parsing in Watson", IBM J. Res. & Dev. Vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

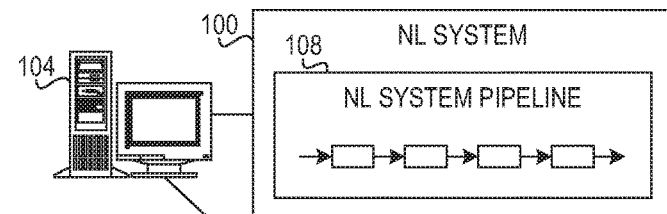
FIG. 1
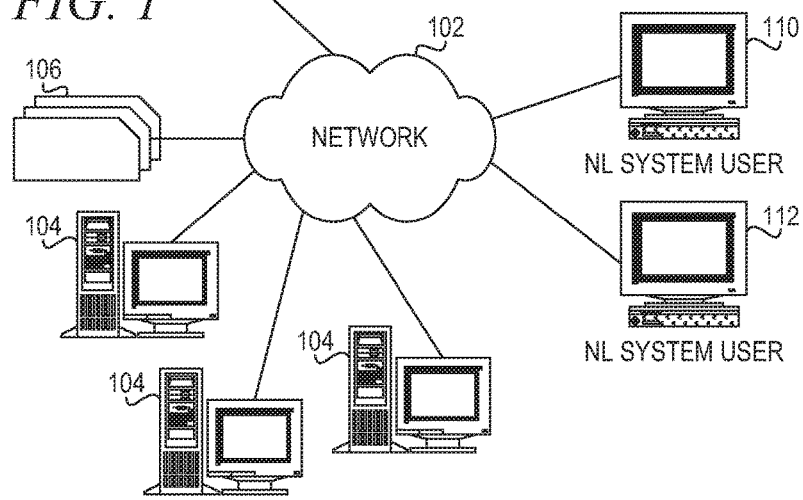
FIG. 2
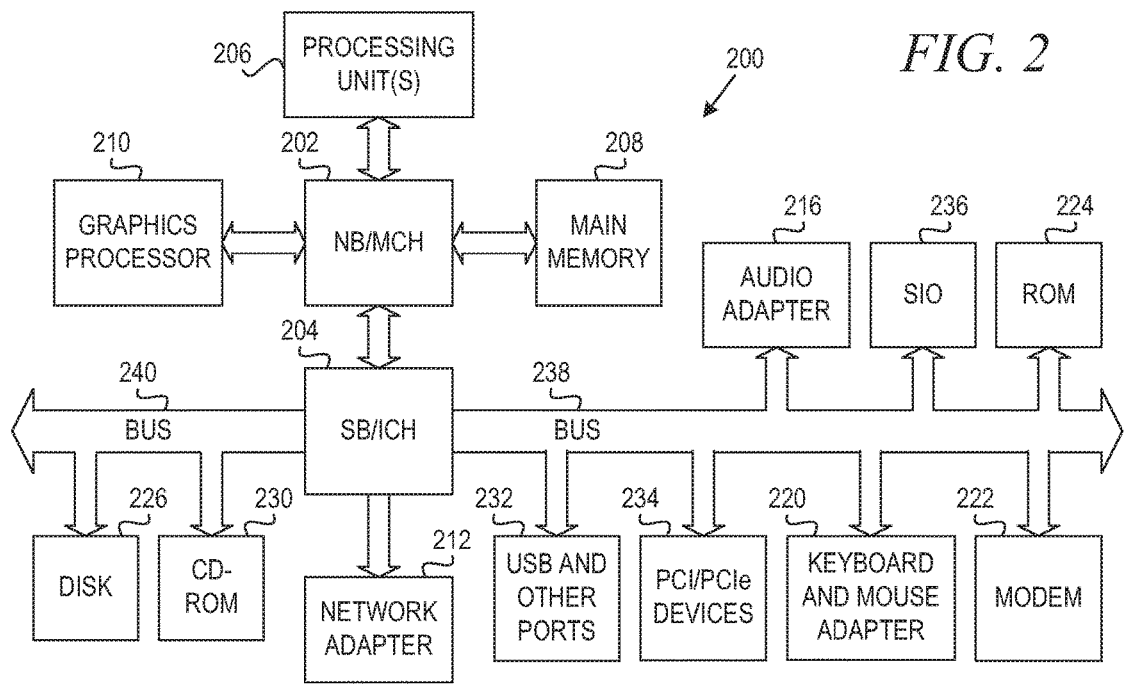

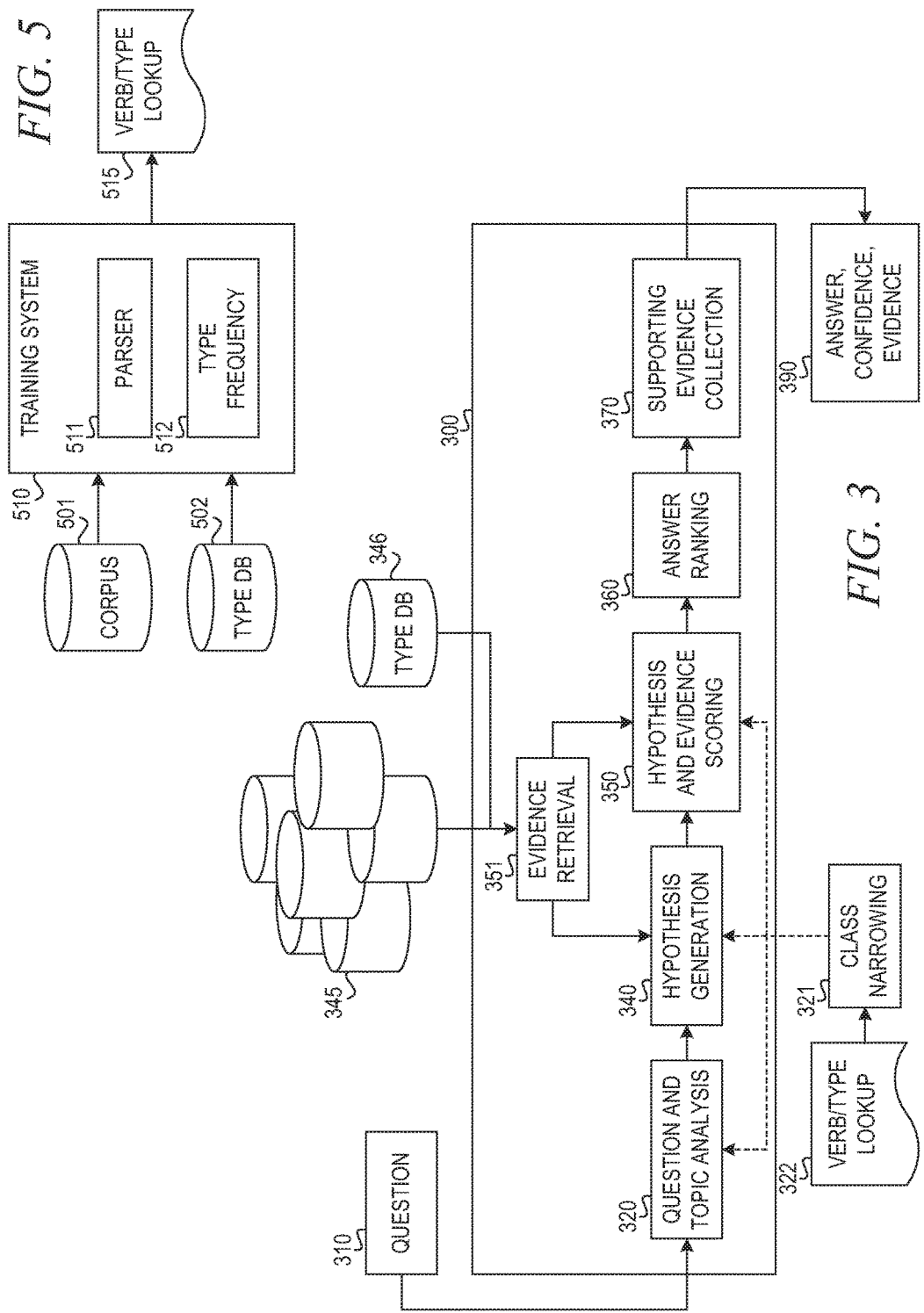

| VERB LEMMA | ARGUMENT SLOT | CLASSES |
|---|---|---|
| elect | obj | Person:1.0 Living_Thing:1.0 Politician:0.66 |

| VERB LEMMA | ARGUMENT SLOT | CLASSES |
|---|---|---|
| elect | obj | Person:1.0/1010473 Living_Thing:1.0/1090309 Politician:0.66/2578 |

| VERB LEMMA | ARGUMENT SLOT | CLASSES |
|---|---|---|
| elect | obj | Person:9.89E-07 Living_Thing:9.17E-07 Politician:0.00025 |

| VERB LEMMA | ARGUMENT SLOT | CLASSES |
|---|---|---|
| elect | obj | Person:0.0038 Living_Thing:0.0036 Politician:0.996 |

US 10,002,124 B2

CLASS-NARROWING FOR TYPE-RESTRICTED ANSWER LOOKUPS

BACKGROUND

The present application relates generally to an improved data processing apparatus and method and more specifically to mechanisms for class narrowing for type-restricted answer lookups.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples of QA systems are the IBM Watson™ system available from International Business Machines (IBM®) Corporation of Armonk, N.Y., Siri® from Apple®, and Cortana® from Microsoft®. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system configured with a natural language processing pipeline executing on at least one processor of the data processing system, for class narrowing for answer lookups. The method comprises annotating, by the natural language processing pipeline, an input question with a verb in the input question and a syntactic relation between the verb and a focus of the question. The method further comprises finding, by a class narrowing component of the natural language processing pipeline, an entry in a verb/type lookup resource corresponding to the verb and the syntactic relation. The entry comprises the verb, the syntactic relation, and a set of classes. Each given class in the set of classes has a corresponding frequency value representing a frequency the given class occurs with the syntactic relation to the verb. The method further comprises performing, by the class narrowing component, class-narrowed type-restricted answer lookup from a topology based on the entry in the verb/type lookup resource to generate a set of candidate answers.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 depicts a schematic diagram of one illustrative embodiment of a natural language processing system in a computer network;

FIG. 2 is a block diagram of an example data processing system in which aspects of the illustrative embodiments are implemented;

FIG. 3 illustrates a natural language processing system pipeline for processing an input question in accordance with one illustrative embodiment:

FIG. 5 is a block diagram illustrating a training system for generating a verb/type lookup resource in accordance with an illustrative embodiment;

DETAILED DESCRIPTION

Figures 4A, 4B, 4C, 4D, 6:
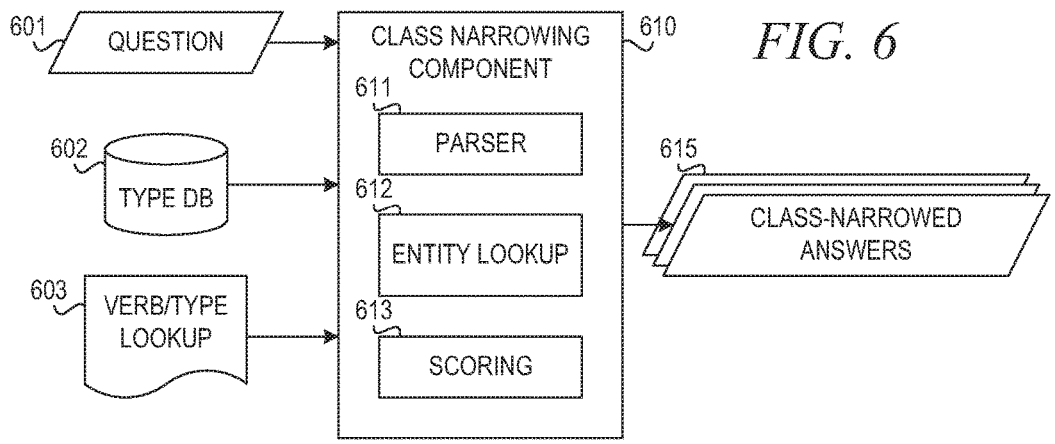
FIGS. 4A-4D illustrate examples of an entry in the verb/type lookup resource in accordance with embodiments of the illustrative embodiments.
FIG. 6 is a block diagram illustrating a class narrowing component in accordance with an illustrative embodiment.

A cognitive question and answering system, or QA system, is a computer system that receives a question in natural language or query format and returns an answer or answers. In the automatic question answering task, having an informative lexical answer type (LAT) is very helpful. For example, the question, "What American president signed the Affordable Care Act?" is an easier question than "Who signed the Affordable Care Act?" Unfortunately, end users often do not provide an informative LAT. The illustrative embodiments provide mechanisms to mitigate the problem of under-informative LATs.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example natural language (NL) processing system, such as a Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these NL processing mechanisms.

With respect to the example embodiment of a QA system, it is important to first have an understanding of how question answering in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of natural language processing mechanisms with which the illustrative embodiments are implemented. Many modifications to the example NL processing system shown in FIGS. 1-3 may be implemented in various embodiments of the present invention without departing from the spirit and scope of the present invention.

As an overview, a Question Answering system (QA system) is an artificial intelligence application, also referred to as a cognitive system, executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which is then interpreted by the QA system and providing a response containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, analyzes the question to extract the major elements of the question, uses the extracted element to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of scoring algorithms. There may be hundreds or even thousands of scoring algorithms applied, each of which performs different analysis, e.g., comparisons, natural language analysis, lexical analysis, or the like, and generates a score. For example, some scoring algorithms may look at the matching of terms and synonyms within the language of the input question and the found portions of the corpus of data. Other scoring algorithms may look at temporal or spatial features in the language, while others may evaluate the source of the portion of the corpus of data and evaluate its veracity.

The scores obtained from the various scoring algorithms indicate the extent to which the potential response is likely to be a correct answer to the input question based on the specific area of focus of that scoring algorithm. Each resulting score is then weighted against a statistical model, which is used to compute the confidence that the QA system has regarding the evidence for a candidate answer being the correct answer to the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, etc.). Conventional question answering systems are capable of generating answers based on the corpus of data and the input question, verifying answers to a collection of questions from the corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information usable by the QA system to identify these question-and-answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a natural language processing system 100 in a computer network 102. One example of a question/answer generation, which may be used in conjunction with the principles described herein, is described in U.S. Patent Application Publication No. 2011/0125734, which is herein incorporated by reference in its entirety. The NL processing system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. In the depicted example, NL processing system 100 and network 102 enables question answering functionality for one or more QA system users via their respective computing devices 110-112. Other embodiments of the NL processing system 100 may be used with components, systems, subsystems, and/or devices other than those that are depicted herein.

The NL processing system 100 is configured to implement an NL system pipeline 108 that receives inputs from various sources. For example, the NL processing system 100 receives input from the network 102, a corpus of electronic documents 106, NL system users, and/or other data and other possible sources of input. In one embodiment, some or all of the inputs to the NL processing system 100 are routed through the network 102. The various computing devices 104 on the network 102 include access points for content creators and NL system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the NL processing system 100 may operate in environments of any size, including local and global, e.g., the Internet.

In one embodiment, the content creator creates content in a document of the corpus of data 106 for use as part of a corpus of data with the NL processing system 100. The document includes any file, text, article, or source of data for use in the NL processing system 100. NL system users access the NL processing system 100 via a network connection or an Internet connection to the network 102, and input questions to the NL processing system 100 that are answered by the content in the corpus of data 106. In one embodiment, the questions are formed using natural language. The NL processing system 100 analyzes and interprets the question, and provides a response to the NL system user, e.g., NL processing system user 110, containing one or more answers to the question. In some embodiments, the NL processing system 100 provides a response to users in a ranked list of candidate answers while in other illustrative embodiments, the NL processing system 100 provides a single final answer or a combination of a final answer and ranked listing of other candidate answers.

The NL processing system 100 implements NL system pipeline 108, which comprises a plurality of stages for processing an input question and the corpus of data 106. The NL processing system pipeline 108 generates answers for the input question based on the processing of the input question and the corpus of data 106. The NL processing system pipeline 108 will be described in greater detail hereafter with regard to FIG. 3.

In some illustrative embodiments, the NL processing system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question, which it then analyzes to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of scoring algorithms. The scores obtained from the various scoring algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements an NL processing system 100 and NL system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206.

The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a natural language processing system pipeline for processing an input question in accordance with one illustrative embodiment. The natural language (NL) processing system pipeline of FIG. 3 may be implemented, for example, as NL system pipeline 108 of NL processing system 100 in FIG. 1. It should be appreciated that the stages of the NL processing system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The NL system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

In the depicted example, NL system pipeline 300 is implemented in a Question Answering (QA) system. The description that follows refers to the NL system pipeline or the NL system pipeline as a QA system; however, aspects of the illustrative embodiments may be applied to other NL processing systems, such as Web search engines that return semantic texts from a corpus of documents.

As shown in FIG. 3, the NL system pipeline 300 comprises a plurality of stages 310-390 through which the NL system operates to analyze an input question and generate a final response. In an initial question input stage, the NL system receives an input question 310 that is presented in a natural language format. That is, a user inputs, via a user interface, an input question 310 for which the user wishes to obtain an answer, e.g., "Who were Washington's closest advisors?" In response to receiving the input question 310, the next stage of the NL system pipeline 300, i.e. the question and topic analysis stage 320, analyzes the input question using natural language processing (NLP) techniques to extract major elements from the input question, and classify the major elements according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, etc. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of attention deficit disorder with relatively few side effects?," the focus is "What drug" since if this phrase were replaced with the answer it would generate a true sentence, e.g., the answer "Adderall" can be used to replace the phrase "What drug" to generate the sentence "Adderall has been shown to relieve the symptoms of attention deficit disorder with relatively few side effects." The focus often, but not always, contains the LAT. On the other hand, in many cases it is not possible to infer a meaningful LAT from the focus.

Referring again to FIG. 3, the identified major elements of the question are then used during a hypothesis generation stage 340 to decompose the question into one or more search queries that are applied to the corpora of data/information 345 in order to generate one or more hypotheses. The queries are applied to one or more text indexes storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used in the hypothesis generation stage 340, to generate hypotheses for answering the input question 310. These hypotheses are also referred to herein as "candidate answers" for the input question. For any input question, at this stage 340, there may be hundreds of hypotheses or candidate answers generated that may need to be evaluated.

The NL system pipeline 300, in stage 350, then performs analysis and comparison of the language of the input question and each hypothesis or "candidate answer," as well as performs evidence scoring to evaluate the likelihood that the particular hypothesis is a correct answer for the input question. This involves evidence retrieval 351, which retrieves passages from corpora 345. Hypothesis and evidence scoring phase 350 uses a plurality of scoring algorithms, each performing a separate type of analysis of the language of the input question and/or content of the corpus that provides evidence in support of, or not in support of, the hypothesis. Each scoring algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

For example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

Another source of input for candidate answers is type information. For example, a candidate answer may be mapped to a plurality of types using structured or unstructured sources, like DBpedia, YAGO, or wordnet. In this case, the type of the candidate answer is used directly. For example, in the question "What president signed the Affordable Care Act?" the candidate answer "Angela Merkel" would be a poor choice of answer because it is of the wrong type ("German Chancellor" instead of "American President").

It should be appreciated that this is just one simple example of how scoring can be performed. Many other algorithms of various complexities may be used to generate scores for candidate answers and evidence without departing from the spirit and scope of the present invention.

In many cases, the LAT is not very helpful. Consider the following examples:
1. Who was elected to the white house in 2012?
2. When was JFK sworn in?
3. Where was Barrack Obama born?

In these cases, there is no helpful LAT. "Who" is unhelpful because it is overly broad. "Who" can refer to a person, an organization, a nation, etc. "When" could reasonably apply to a year, a month, a specific date, a season, etc. "Where" can mean a city, a country, or even a specific building. A human reader, however, can clearly infer that the answer to question 1 above should be "president," "office holder," "politician," or the like, not just "person" and certainly not "geo-political entity." The answer to question 2 above should provide an exact date (1961-01-20, not "winter"). The answer to question 3 should provide a city or state, not just any location. "Hawaii" would be acceptable, but not "Earth" or "hospital."

The mechanism of the illustrative embodiment mines a large unstructured corpus, such as corpus 345, to identify more specific LAT types that correspond with common verbal arguments. For example, the mechanisms hope to find many sentences like "Arnold Schwarzenegger was elected governor of California," and "Texas elected George W. Bush," in which the syntactic object of "elect" is of the type "politician" according to a semantic web, type system, or type database, such as DBPedia, which is a triples database scraped from Wikipedia. Thus, in response to a question in which the focus is in the object relation to "elect," an answer to the question should identify an entity of the type "politician."

The same reasoning applies for "when" questions—"sworn" would suggest an exact date, whereas "defeated" might expect just a year, and "mature" might expect an age (e.g., "When do polar bears mature completely?"). This works with "where" as well—"born" suggests a city and state, "live" might suggest a specific site like the White House (e.g., "Where does the president of the United States live?"), and "strike" might suggest and exact geographical location (e.g., "Where did Japan strike in 1941?") or even a body part ("Where does Leukemia strike first?"). By identifying the types that tend to go with particular verbal arguments, the mechanisms of the illustrative embodiments can identify better answers from structured sources.

The results of the training process is verb/type lookup resource 322, which indicates how frequently verbal arguments appear with various types. The mechanism of the illustrative embodiment uses WordNet-derived types encompassed in the YAGO type ontology, as represented in DBPedia. WordNet is a lexical database for the English language. It groups English words into sets of synonyms called synsets, provides short definitions and usage examples, and records a number of relations among these synonym sets or their members. WordNet can thus be seen as a combination of dictionary and thesaurus. While it is accessible to human users via a web browser, its primary use is in automatic text analysis and artificial intelligence applications. YAGO (Yet Another Great Ontology) is a knowledge base that is automatically extracted from Wikipedia and other sources. DBpedia is a project aiming to extract structured content from the information created as part of the Wikipedia project. This structured information is then made available on the World Wide Web. DBpedia allows users to semantically query relationships and properties associated with Wikipedia resources, including links to other related datasets.

Consider the following example sentences from a training corpus:

1. Barack Obama was elected in 2008.
2. The people of the United States elected George W. Bush in a hotly contested election.
3. The local homeowners association unanimously elected John Q. Everyman as the new chairman.

Considering the word "elect" and its object slot, there are three instances of "elect" in the small training corpus above. Upon consulting the database of types, the mechanism of the illustrative embodiment concludes that all three of the objects of "elect" are of type "person" and "living_thing." Furthermore, George W. Bush and Barack Obama are politicians. This means that "person" and "living_thing" get an initial score of 1 (100%), and "politician" gets an initial score of ⅔ (66% or 0.66).

FIGS. 4A-4D illustrate examples of an entry in the verb/type lookup resource in accordance with embodiments of the illustrative embodiments. FIG. 4A illustrates an entry for the verb lemma "elect" with the entity in the object argument slot ("obj"). The classes associated with the object argument slot are "person," "living_thing," and "politician." The entry includes the frequency values for each of the classes.

In one embodiment, the mechanism divides each of the frequency values by the total number of instances of that type in the resource, which is a separate reference apart from the corpus. This separate reference may be of any form—a triple store, an exhaustive list, or any other mapping of entities to their types. For the purpose of this example, we will assume the use of YAGO types as represented in DBPedia. There is a large number of entities of type "person" (1,010,473) and "living thing" (1,090,309) and a smaller number of entities of type "politician" (2,578). FIGS. 4B and 4C illustrate results of dividing the frequency values by the number of instances of that type in the resource.

The mechanism may then apply a scaling factor so that the frequency values are within the range of 0 to 1. FIG. 4D illustrates the example entry of the verb/type lookup resource 415 with the scaled frequency values. According to the entry shown in FIG. 4D, when receiving a question like "Who was elected in 1992?" hypothesis generation stage 340 and hypothesis and evidence scoring phase 350 should strongly prefer entities where the answer was of type "politician" but not rule out non-politician people or living things. This mirrors human intuition.

In the depicted example in FIGS. 4A-4D, the argument slot is "obj"; however, for other examples the argument slot may include other argument slots, such as subject ("subj"). For example, in the example question "Who defeated Mitt Romney?" the verb lemma is "defeat," and the argument slot is "subj."

In accordance with an illustrative embodiment, question and topic analysis stage 320, hypothesis generation stage 340, and/or hypothesis and evidence scoring stage 350 may include a class narrowing component 321 for performing class narrowing for type-restricted answer lookups. During runtime, for a question like "Who was elected governor of California?" class narrowing component 321 identifies that "elected" is syntactically connected to the focus in the "obj" relation. In accordance with the illustrative embodiment, hypothesis generation stage 340 uses type-restricted answer lookup to access type DB 346, which may be DBPedia, for example, and extract entities that are at most some N steps away from each named entity in the question (in this case "California") and are of the proper type, as given by the LAT. Unfortunately, the LAT in the example question is vague; "who" can apply to people, organizations, or geopolitical entities. This means that "Oregon," "California State Legislature," "University of California," and "Giuseppe Garibaldi" would all be equally acceptable candidate answers, because they are all just one hop away from "California" and are of the correct type.

In the illustrative embodiment, class narrowing component 321 accesses verb/type lookup resource 322 and determines that the object of "elect" is almost always "politician." Therefore, class narrowing component 321 weights and/or filters the candidate answers according to this weighting before passing them through the pipeline 300.

In answer ranking stage 360, the scores generated by the various scoring algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonyms may be set relatively higher than other algorithms that evaluate publication dates for evidence passages.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by answer ranking stage 360, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers").

Supporting evidence collection phase 370 collects evidence that supports the candidate answers from answer ranking phase 360. From the ranked listing of candidate answers in stage 360 and supporting evidence from supporting evidence collection stage 370, NL system pipeline 300 generates a final answer, confidence score, and evidence 380, or final set of candidate answers with confidence scores and supporting evidence, and outputs answer, confidence, and evidence 390 to the submitter of the original input question 310 via a graphical user interface or other mechanism for outputting information.

FIG. 5 is a block diagram illustrating a training system for generating a verb/type lookup resource in accordance with an illustrative embodiment. Training system 510 accesses corpus 501 and type database (DB) 502. Training system 510 includes parser component 511 and type frequency component 512.

Parser component 511 annotates each sentence in corpus 501 with syntactic relations and entities from type DB 502. Type frequency component 512 counts the number of instances of each given verb in a given syntactic relationship with a given database entity. Type frequency component 512 stores entries in verb/type lookup resource 515 for each instance of a given verb, syntactic relationship, database entity tuple with a count of each database entity for the given verb and syntactic relationship. Verb/type lookup resource 515 may be a lookup data structure, such as a table, for example.

Training system 510 mines a large unstructured corpus to identify more specific LAT types that correspond with common verbal arguments. The results of the training process is a verb/type lookup resource 515 that indicates how frequently verbal arguments appear with various types. In one embodiment, training system 510 divides each of the frequency values by the total number of instances of that type in the resource, which is a separate reference apart from the corpus. Training system 510 may then apply a scaling factor so that the frequency values are within the range of 0 to 1.

FIG. 6 is a block diagram illustrating a class narrowing component in accordance with an illustrative embodiment. Class narrowing component 610 receives a question 601 and accesses type database (DB) 602 and verb/type lookup resource 603. Class narrowing component 610 includes parser component 611, entity lookup component 612, and scoring component 613. Class narrowing component 610 sets a tuning parameter, b, such that $0 \leq b \leq 1$. A lower value of b results in the class narrowing component 610 considering more types, and a lower value of b results in the class narrowing component 610 being more restrictive.

Parser component 611 annotates question 601 with syntactic relations, more particularly relations between a verb and at least one entity. Entity lookup component 612 finds an entry in the verb/type lookup resource 603 based on the verb and the relation to the entity. Entity lookup component 612 determines a type or class in the entry having a highest frequency value. Entity lookup component 612 then determines a set of types having a frequency value greater than a predetermined value based on the tuning parameter and the highest frequency value.

Entity lookup component 612 then looks up all database entities in type DB 602 that are connected to the entity in the question by a predetermined number N of hops and are of a type within the determined set of types. The number N may be decreased or increased to consider looser relations or closer relations, respectively. Entity lookup component 612 adds those database entities to a set of candidate answers 615.

Scoring component 613 determines a score for each candidate answer. In one embodiment, the score may be determined as follows:

score=i×b, where i is the frequency value from the verb/type lookup and b is the tuning parameter. Scoring component 613 then assigns the scores to the class-narrowed candidate answers 615.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
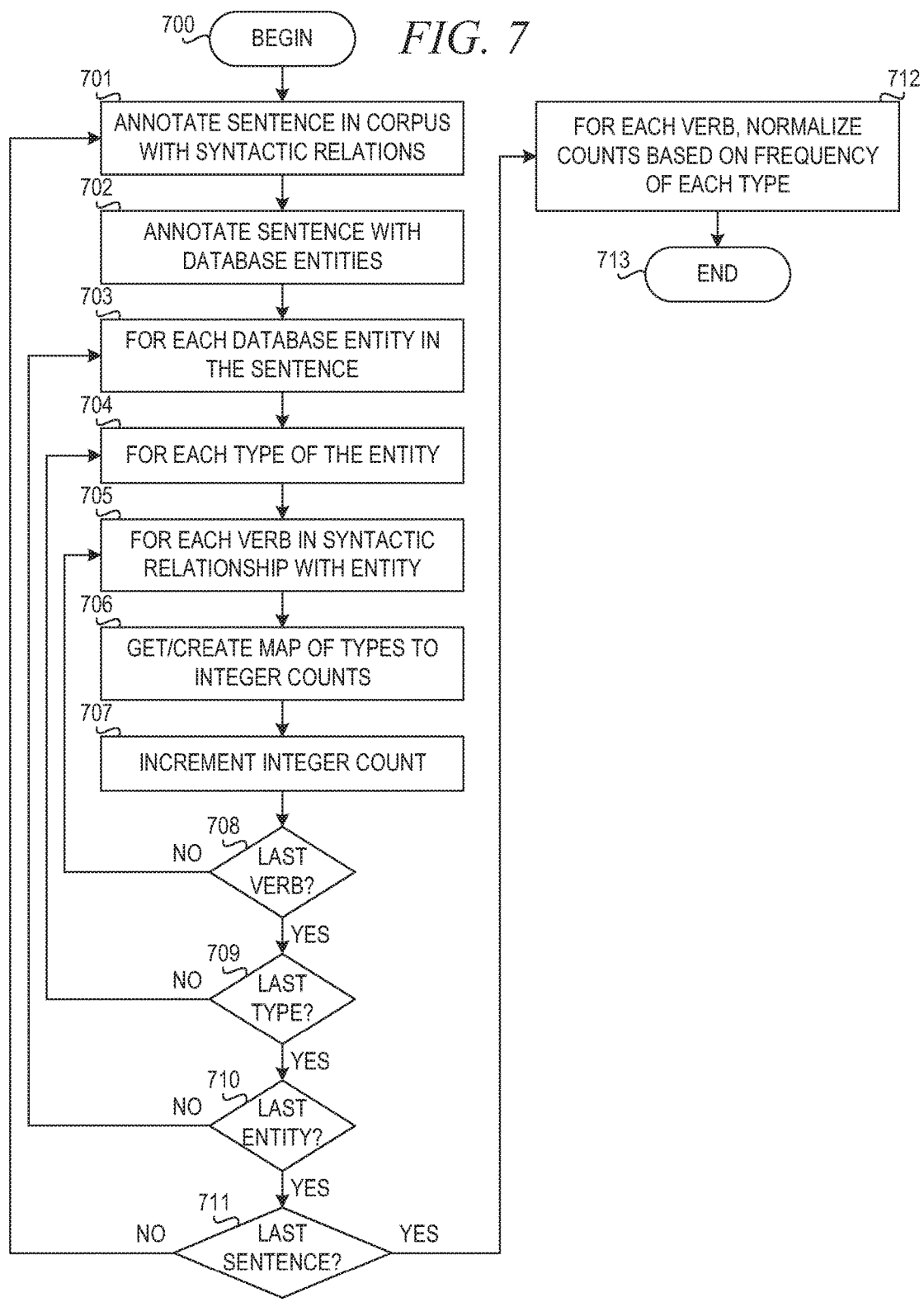
FIG. 7 is a flowchart illustrating operation of training a verb/type lookup resource in accordance with an illustrative embodiment.

FIG. 7 is a flowchart illustrating operation of training a verb/type lookup resource in accordance with an illustrative embodiment. Operation begins (block 700), and a training system annotates a sentence in the corpus with syntactic relations (block 701). The training system annotates the sentence with database entities (block 702). For each database entity in the sentence (block 703), for each type of the entity (block 704), and for each verb in syntactic relationship with the entity (block 705), the training system gets or creates a map of types to integer counts (block 706). The integer count represents a number of instances of the current verb in the given relationship with the current entity. The training system sets the integer count to 1 for the first instance or increments the integer count for subsequent instances (block 707).

The training system determines whether the current verb is the last verb in syntactic relationship with the entity (block 708). If the current verb is not the last verb in syntactic relationship with the entity, then operation returns to block 705 to consider the next verb in syntactic relationship with the entity.

If the current verb is the last verb in the syntactic relation with the current entity in block 708, then the training system determines whether the current type of the entity is the last type (block 709). If the current type of the entity is not the last type, then operation returns to block 704 to consider the next type of the entity.

If the current type of the entity is the last type in block 709, then the training system determines whether the current entity is the last database entity in the sentence (block 710). If the current entity is not the last database entity, then operation returns to block 703 to consider the next database entity in the sentence.

If the current entity is the last database entity in the sentence in block 710, then the training system determines whether the sentence is the last sentence in the corpus (block 711). If the current sentence is not the last sentence in the corpus, then operation returns to block 701 to annotate the next sentence in the corpus with syntactic relations.

If the current sentence is the last sentence in the corpus in block 711, then the training system normalizes, for each verb, all counts based on the frequency of each type (block 712). Thereafter, operation ends.

Figure 8:
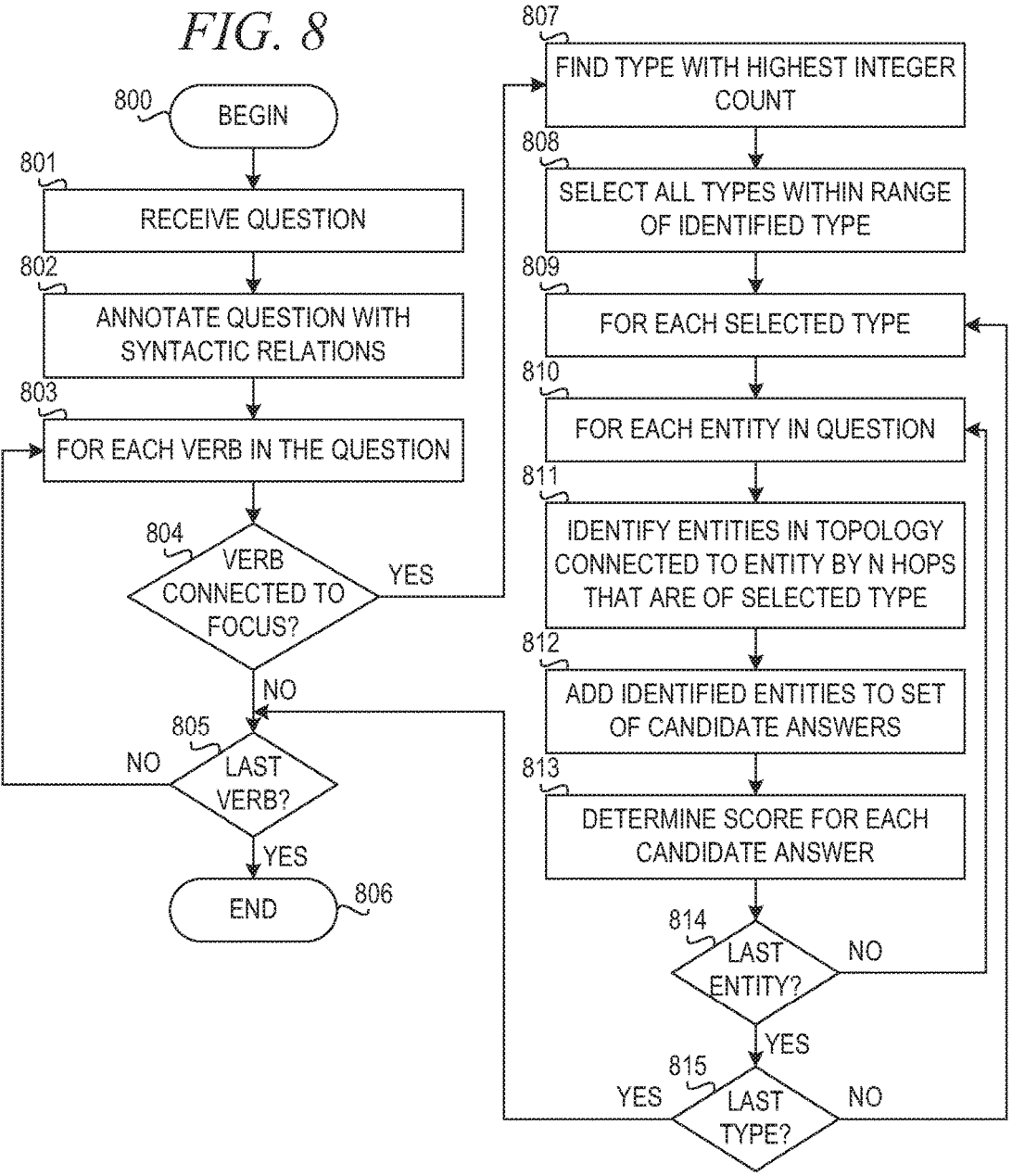
FIG. 8 is a flowchart illustrating operation a class narrowing component for class narrowing for type-restricted answer lookup in accordance with an illustrative embodiment.

FIG. 8 is a flowchart illustrating operation a class narrowing component for class narrowing for type-restricted answer lookup in accordance with an illustrative embodiment. Operation begins (block 800), and the class narrowing component receives a question (block 801). The class narrowing component annotates the question with syntactic relations (block 802). More particularly, the class narrowing component annotates the question with a verb and a focus of the question.

For each verb in the question (block 803), the class narrowing component determines whether the verb is connected to the focus (block 804). If the verb is not connected to the focus, the class narrowing component determines whether the verb is the last verb in the question (block 805). If the verb is not the last verb in the question, then operation returns to block 803 to consider the next verb. If the verb is the last verb in the question in block 805, then operation ends (block 806).

Returning to block 804, if the verb is connected to the focus, the class narrowing component consults the verb/type lookup resource and finds a type with the syntactic relation to the verb that has the highest integer count (block 807). The class narrowing component selects all types in the entry of the verb/type lookup resource having an integer count within a range of the highest integer count (block 808). For each selected type (block 809) and for each entity in the question (block 810), the class narrowing component identifies entities in the topology connected to the entity by a predetermined number N of hops that are of the selected type (block 811). The class narrowing component then adds the identified entities from the topology to the set of candidate answers (block 812). The class narrowing component determines a score for each of the entities added as candidate answers (block 813).

The class narrowing component determines whether the entity is the last entity in the question (block 814). If the entity is not the last entity in the question, operation returns to block 810 to consider the next entity in the question. If the entity is the last entity in the question in block 814, then the class narrowing component determines whether the current selected type is the last type selected in block 808 (block 815). If the current selected type is not the last selected type, then operation returns to block 809 to consider the next selected type. If the current selected type is the last selected type in block 815, then operation returns to block 805 to determine whether the current verb is the last verb in the question.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to specifically configure the at least one processor to implement a question answering system configured with a natural language processing pipeline executing on the at least one processor of the data processing system for class narrowing for answer lookups, the method comprising:
   receiving, by a question and topic analysis stage of the natural language processing pipeline, an input question;
   annotating, by the question and topic analysis stage of the natural language processing pipeline, the input question with a verb in the input question and a syntactic relation between the verb and a focus of the question;
   finding, by a class narrowing component of the natural language processing pipeline, an entry in a verb/type lookup resource corresponding to the verb and the syntactic relation, wherein the entry comprises the verb, the syntactic relation, and a set of classes, wherein each given class in the set of classes has a corresponding frequency value representing a frequency the given class occurs with the syntactic relation to the verb;
   performing, by the class narrowing component, class-narrowed type-restricted answer lookup from a topology based on the entry in the verb/type lookup resource to generate a set of candidate answers;
   scoring, by a hypothesis and evidence scoring stage of the natural language processing pipeline, the set of candidate answers to generate for each candidate answer a confidence score;
   ranking, by an answer ranking stage of the natural language processing pipeline, the set of candidate answers by confidence score to form a ranked set of candidate answers; and
   outputting, by the natural language processing pipeline, the ranked set of candidate answers.

2. The method of claim 1, wherein performing the class-narrowed type-restricted answer lookup comprises:
   selecting a class within the set of classes;
   identifying a set of entities in a topology connected to at least one entity in the question that are at most a predetermined number of hops from the at least one entity in the question and are of the selected class; and
   adding the set of entities to the set of candidate answers.

3. The method of claim 2, wherein performing the class-narrowed type-restricted answer lookup further comprises determining a score for a given candidate answer corresponding to the selected class based on a frequency value of the class in the entry from the verb/type lookup resource and a tuning parameter.

4. The method of claim 2, wherein selecting the class comprises identifying a class within the set of classes having a highest frequency value and selecting each class within the set of classes having a frequency value greater than a threshold, wherein the threshold is a function of the highest frequency value and a tuning parameter.

5. The method of claim 1 further comprising training the verb/type lookup resource using a type database resource and a corpus of information.

6. The method of claim 5, wherein training the verb/type lookup resource comprises, for each sentence in the corpus of information:
   annotating the sentence with a verb, a database entity, and a syntactic relation between the verb and the database entity;
   responsive to determining an entry for the verb and syntactic relation does not exist in the verb/type lookup resource, create an entry for the verb and syntactic relation with a class of the database entity and an integer count of one; and
   responsive to determining an entry for the verb and syntactic relation exists in the verb/type lookup resource, increment an integer count for a class of the database entity in the entry.

7. The method of claim 6, wherein training the verb/type lookup resource further comprises normalizing counts based on the frequency of each type in a resource.

8. A computer program product comprising a non-transitory computer readable storage medium having a computer readable program stored therein, wherein the computer readable program, when executed on a computing device, causes the computing device implement question answering system configured, with a natural language processing pipeline executing on the computing device for class narrowing for answer lookups, wherein the computer readable program causes the computing device to:
  receive, by a question and topic analysis stage of the natural language processing pipeline, put question;
  annotate, by the question and topic analysis stage of the natural language processing pipeline, the input question with a verb in the input question and a syntactic relation between the verb and a focus of the question;
  find, by a class narrowing component of the natural language processing pipeline, an entry in a verb/type lookup resource corresponding to the verb and the syntactic relation, wherein the entry comprises the verb, the syntactic relation, and a set of classes, wherein each given class in the set of classes has a corresponding frequency value representing a frequency the given class occurs with the syntactic relation to the verb;
  perform, by the class narrowing component, class-narrowed type-restricted answer lookup from a topology based on the entry in the verb/type lookup resource to generate a set of candidate answers;
  score, by a hypothesis and evidence scoring stage of the natural language processing pipeline, the set of candidate answers to generate for each candidate answer a confidence score;
  rank, by an answer ranking stage of the natural language processing pipeline, the set of candidate answers by confidence score to form a ranked set of candidate answers; and
  output, by the natural language processing pipeline, the ranked set of candidate answers.

9. The computer program product of claim 8, wherein performing the class-narrowed type-restricted answer lookup comprises:
  selecting a class within the set of classes;
  identifying a set of entities in a topology connected to at least one entity in the question that are at most a predetermined number of hops from the at least one entity in the question and are of the selected class; and
  adding the set of entities to the set of candidate answers.

10. The computer program product of claim 9, wherein performing the class-narrowed type-restricted answer lookup further comprises determining a score for a given candidate answer corresponding to the selected class based on a frequency value of the class in the entry from the verb/type lookup resource and a tuning parameter.

11. The computer program product of claim 9, wherein selecting the class comprises identifying a class within the set of classes having a highest frequency value and selecting each class within the set of classes having a frequency value greater than a threshold, wherein the threshold is a function of the highest frequency value and a tuning parameter.

12. The computer program product of claim 8, wherein the computer readable program further causes the computing device to train the verb/type lookup resource using a type database resource and a corpus of information.

13. The computer program product of claim 12, wherein training the verb/type lookup resource comprises, for each sentence in the corpus of information:
  annotating the sentence with a verb, a database entity, and a syntactic relation between the verb and the database entity;
  responsive to determining an entry for the verb and syntactic relation does not exist in the verb/type lookup resource, create an entry for the verb and syntactic relation with a class of the database entity and an integer count of one; and
  responsive to determining an entry for the verb and syntactic relation exists in the verb/type lookup resource, increment an integer count for a class of the database entity in the entry.

14. The computer program product of claim 13, wherein training the verb/type lookup resource further comprises normalizing counts based on the frequency of each type in a resource.

15. An apparatus comprising;
  a processor; and
  a memory coupled to the processor, wherein the memory comprises instructions which, when executed by the processor, cause the processor to implement question answering system configured with a natural language processing pipeline executing on the computing device for class narrowing for answer lookups, wherein the instructions cause the processor to:
  receive, by a question and topic analysis stage of the natural language processing pipeline, an input question;
  annotate, by the question and topic analysis stage of the natural language processing pipeline, the input question with a verb in the input question and a syntactic relation between the verb and a focus of the question;
  find, by a class narrowing component of the natural language processing pipeline, an entry in a verb/type lookup resource corresponding to the verb and the syntactic relation, wherein the entry comprises the verb, the syntactic relation, and a set of classes, wherein each given class in the set of classes has a corresponding frequency value representing a frequency the given class occurs with the syntactic relation to the verb;
  perform, by the class narrowing component, class-narrowed type-restricted answer lookup from a topology based on the entry in the verb/type lookup resource to generate a set of candidate answers;
  score, by a hypothesis and evidence scoring stages of the natural language processing pipeline, the set of candidate answers to generate for each candidate answer a confidence score;
  rank, by an answer ranking stage of the natural language processing pipeline, the set of candidate answers by confidence score to form a ranked set of candidate answers; and
  output, by the natural language processing pipeline, the ranked set of candidate answers.

16. The apparatus of claim 15, wherein performing the class-narrowed type-restricted answer lookup comprises:
  selecting a class within the set of classes;
  identifying a set of entities in a topology connected to at least one entity in the question that are at most a predetermined number of hops from the at least one entity in the question and are of the selected class; and
  adding the set of entities to the set of candidate answers.

17. The apparatus of claim 16, wherein performing the class-narrowed type-restricted answer lookup further comprises determining a score for a given candidate answer corresponding to the selected class based on a frequency value of the class in the entry from the verb/type lookup resource and a tuning parameter.

18. The apparatus of claim 16, wherein selecting the class comprises identifying a class within the set of classes having a highest frequency value and selecting each class within the set of classes having a frequency value greater than a threshold, wherein the threshold is a function of the highest frequency value and a tuning parameter.

19. The apparatus of claim 15, wherein the instructions further causes the processor to train the verb/type lookup resource using a type database resource and a corpus of information.

20. The apparatus of claim 19, wherein training the verb/type lookup resource comprises, for each sentence in the corpus of information:
   annotating the sentence with a verb, a database entity, and a syntactic relation between the verb and the database entity;
   responsive to determining an entry for the verb and syntactic relation does not exist in the verb/type lookup resource, create an entry for the verb and syntactic relation with a class of the database entity and an integer count of one; and
   responsive to determining an entry for the verb and syntactic relation exists in the verb/type lookup resource, increment an integer count for a class of the database entity in the entry.

* * * * *